United States Patent
Dickerson et al.

(10) Patent No.: US 7,965,225 B1
(45) Date of Patent: Jun. 21, 2011

(54) RADAR ANTENNA STABILIZATION ENHANCEMENT USING VERTICAL BEAM SWITCHING

(75) Inventors: Charles J. Dickerson, Alburnett, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 119 days.

(21) Appl. No.: 12/167,208

(22) Filed: Jul. 2, 2008

(51) Int. Cl.
*G01S 13/00* (2006.01)

(52) U.S. Cl. .............................. 342/73; 342/75; 342/165

(58) Field of Classification Search .................. 342/26 B
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,680,094 A | 7/1972 | Bayle et al. | |
| 3,739,380 A | 6/1973 | Burdic et al. | |
| 3,781,878 A | 12/1973 | Kirkpatrick | |
| 3,810,175 A | 5/1974 | Bell | |
| 3,815,132 A | 6/1974 | Case, Jr. et al. | |
| 3,885,237 A | 5/1975 | Kirkpatrick | |
| 4,024,537 A | 5/1977 | Hart | |
| 4,058,710 A | 11/1977 | Altmann | |
| 4,277,845 A | 7/1981 | Smith et al. | |
| 4,435,707 A | 3/1984 | Clark | |
| 4,628,318 A | 12/1986 | Alitz | |
| 4,646,244 A | 2/1987 | Bateman et al. | |
| 4,685,149 A | 8/1987 | Smith et al. | |
| 4,760,396 A | 7/1988 | Barney et al. | |
| 4,843,398 A * | 6/1989 | Houston | 342/74 |
| 4,924,401 A | 5/1990 | Bice et al. | |
| 4,939,513 A | 7/1990 | Paterson et al. | |
| 5,047,781 A * | 9/1991 | Bleakney | 342/149 |
| 5,049,886 A | 9/1991 | Seitz et al. | |
| 5,175,554 A | 12/1992 | Mangiapane et al. | |
| 5,198,819 A | 3/1993 | Susnjara | |
| 5,247,303 A | 9/1993 | Cornelius et al. | |
| 5,332,998 A | 7/1994 | Avignon et al. | |
| 5,345,241 A | 9/1994 | Huddle | |

(Continued)

OTHER PUBLICATIONS

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.
Wang et al., "A simple based on DSP antenna controller of weather radar," Radar, 2001 CIE International Conference on Proceedings, pp. 1071-1074.
U.S. Appl. No. 12/167,200, filed Jul. 2, 2008, Woodell et al.
U.S. Appl. No. 12/167,203, filed Jul. 2, 2008, Woodell.
Notice of Allowance for U.S. Appl. No. 12/167,200, mail date Oct. 28, 2010, 4 pages.
Office Action for U.S. Appl. No. 12/167,200, mail date Jul. 21, 2010, 6 pages.

(Continued)

*Primary Examiner* — Thomas H Tarcza
*Assistant Examiner* — Timothy A Brainard
(74) *Attorney, Agent, or Firm* — Matthew J. Evans; Daniel M. Barbieri

(57) ABSTRACT

A method of adjusting a position of an antenna to reduce a position error comprises receiving first data associated with first returns associated with a first portion of an antenna. The method further comprises receiving second data associated with second returns associated with a second portion of the antenna, wherein the first portion is different than, intersects with, or includes the second portion. The method further comprises determining the angle to the terrain using the first and second data, whereby the angle is used to adjust or compensate for the position error of the antenna.

12 Claims, 6 Drawing Sheets

U.S. PATENT DOCUMENTS

| | | | |
|---|---|---|---|
| 5,559,518 A * | 9/1996 | DiDomizio | 342/174 |
| 5,820,080 A | 10/1998 | Eschenbach | |
| 5,831,570 A | 11/1998 | Ammar et al. | |
| 5,867,119 A * | 2/1999 | Corrubia et al. | 342/120 |
| 5,920,276 A | 7/1999 | Frederick | |
| 5,923,279 A * | 7/1999 | Bamler et al. | 342/25 C |
| 5,945,926 A | 8/1999 | Ammar et al. | |
| 6,023,240 A | 2/2000 | Sutton | |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,154,169 A | 11/2000 | Kuntman | |
| 6,157,891 A | 12/2000 | Lin | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,184,816 B1 | 2/2001 | Zheng et al. | |
| 6,194,980 B1 | 2/2001 | Thon | |
| 6,201,494 B1 | 3/2001 | Kronfeld | |
| 6,204,806 B1 | 3/2001 | Hoech | |
| 6,208,284 B1 | 3/2001 | Woodell et al. | |
| 6,236,351 B1 | 5/2001 | Conner et al. | |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,317,872 B1 | 11/2001 | Gee et al. | |
| 6,340,946 B1 | 1/2002 | Wolfson et al. | |
| 6,345,127 B1 | 2/2002 | Mitchell | |
| 6,359,585 B1 | 3/2002 | Bechman et al. | |
| 6,373,418 B1 | 4/2002 | Abbey | |
| 6,374,286 B1 | 4/2002 | Gee et al. | |
| 6,377,202 B1 | 4/2002 | Kropfli et al. | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,421,000 B1 | 7/2002 | McDowell | |
| 6,424,288 B1 * | 7/2002 | Woodell | 342/26 R |
| 6,426,717 B1 | 7/2002 | Maloratsky | |
| 6,441,773 B1 | 8/2002 | Kelly et al. | |
| 6,448,922 B1 | 9/2002 | Kelly | |
| 6,452,511 B1 | 9/2002 | Kelly et al. | |
| 6,456,236 B1 | 9/2002 | Hauck et al. | |
| 6,462,703 B2 | 10/2002 | Hedrick | |
| 6,473,026 B1 | 10/2002 | Ali-Mehenni et al. | |
| 6,473,240 B1 | 10/2002 | Dehmlow | |
| 6,492,934 B1 | 12/2002 | Hwang et al. | |
| 6,512,476 B1 | 1/2003 | Woodell | |
| 6,520,056 B1 | 2/2003 | Nemeth et al. | |
| 6,525,674 B1 | 2/2003 | Kelly et al. | |
| 6,531,669 B1 | 3/2003 | Miller et al. | |
| 6,549,161 B1 | 4/2003 | Woodell | |
| 6,567,728 B1 | 5/2003 | Kelly et al. | |
| 6,574,030 B1 | 6/2003 | Mosier | |
| 6,577,947 B1 | 6/2003 | Kronfeld et al. | |
| 6,590,528 B1 | 7/2003 | DeWulf | |
| 6,603,425 B1 | 8/2003 | Woodell | |
| 6,650,275 B1 | 11/2003 | Kelly et al. | |
| 6,650,291 B1 | 11/2003 | West et al. | |
| 6,690,298 B1 | 2/2004 | Barber et al. | |
| 6,690,299 B1 | 2/2004 | Suiter | |
| 6,697,008 B1 | 2/2004 | Sternowski | |
| 6,710,663 B1 | 3/2004 | Berquist | |
| 6,714,186 B1 | 3/2004 | Mosier et al. | |
| 6,724,344 B1 | 4/2004 | Stockmaster et al. | |
| 6,738,011 B1 * | 5/2004 | Evans | 342/26 C |
| 6,741,203 B1 | 5/2004 | Woodell | |
| 6,741,208 B1 | 5/2004 | West et al. | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,771,626 B1 | 8/2004 | Golubiewski et al. | |
| 6,782,392 B1 | 8/2004 | Weinberger et al. | |
| 6,804,614 B1 | 10/2004 | McGraw et al. | |
| 6,806,846 B1 | 10/2004 | West | |
| 6,807,538 B1 | 10/2004 | Weinberger et al. | |
| 6,813,777 B1 | 11/2004 | Weinberger et al. | |
| 6,819,983 B1 | 11/2004 | McGraw | |
| 6,822,617 B1 | 11/2004 | Mather et al. | |
| 6,825,804 B1 | 11/2004 | Doty | |
| 6,839,017 B1 | 1/2005 | Dillman | |
| 6,850,185 B1 | 2/2005 | Woodell | |
| 6,862,323 B1 | 3/2005 | Loper | |
| 6,879,280 B1 | 4/2005 | Bull et al. | |
| 6,882,302 B1 | 4/2005 | Woodell et al. | |
| 6,918,134 B1 | 7/2005 | Sherlock et al. | |
| 6,933,885 B1 | 8/2005 | Stockmaster et al. | |
| 6,938,258 B1 | 8/2005 | Weinberger et al. | |
| 6,950,062 B1 | 9/2005 | Mather et al. | |
| 6,959,057 B1 | 10/2005 | Tuohino | |
| 6,972,727 B1 | 12/2005 | West et al. | |
| 6,977,608 B1 | 12/2005 | Anderson et al. | |
| 6,995,726 B1 | 2/2006 | West et al. | |
| 6,998,908 B1 | 2/2006 | Sternowski | |
| 6,999,022 B1 | 2/2006 | Vesel et al. | |
| 6,999,027 B1 | 2/2006 | Stockmaster | |
| 7,002,546 B1 | 2/2006 | Stuppi et al. | |
| 7,028,304 B1 | 4/2006 | Weinberger et al. | |
| 7,034,753 B1 | 4/2006 | Elsallal et al. | |
| 7,069,120 B1 | 6/2006 | Koenck et al. | |
| 7,089,092 B1 | 8/2006 | Wood et al. | |
| 7,092,645 B1 | 8/2006 | Sternowski | |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,145,501 B1 | 12/2006 | Manfred et al. | |
| 7,148,816 B1 | 12/2006 | Carrico | |
| 7,151,507 B1 | 12/2006 | Herting | |
| 7,158,072 B1 | 1/2007 | Venkatachalam et al. | |
| 7,161,525 B1 | 1/2007 | Finley et al. | |
| 7,170,446 B1 | 1/2007 | West et al. | |
| 7,170,959 B1 | 1/2007 | Abbey | |
| 7,196,329 B1 | 3/2007 | Wood et al. | |
| 7,205,933 B1 | 4/2007 | Snodgrass | |
| 7,218,268 B2 | 5/2007 | VandenBerg | |
| 7,219,011 B1 | 5/2007 | Barber | |
| 7,242,343 B1 | 7/2007 | Woodell | |
| 7,242,345 B2 | 7/2007 | Raestad et al. | |
| 7,250,903 B1 | 7/2007 | McDowell | |
| 7,269,657 B1 | 9/2007 | Alexander et al. | |
| 7,272,472 B1 | 9/2007 | McElreath | |
| 7,292,178 B1 | 11/2007 | Woodell et al. | |
| 7,307,583 B1 * | 12/2007 | Woodell et al. | 342/173 |
| 7,373,223 B2 | 5/2008 | Murphy | |
| 7,379,796 B2 | 5/2008 | Walsdorf et al. | |
| 7,423,578 B1 * | 9/2008 | Tietjen | 342/59 |
| 7,479,920 B2 | 1/2009 | Niv | |
| 7,609,200 B1 | 10/2009 | Woodell et al. | |
| 7,616,150 B1 | 11/2009 | Woodell | |
| 7,633,430 B1 | 12/2009 | Wichgers et al. | |
| 7,639,175 B1 | 12/2009 | Woodell | |
| 7,783,429 B2 | 8/2010 | Walden et al. | |
| 7,791,529 B2 | 9/2010 | Filias et al. | |
| 7,808,422 B1 | 10/2010 | Woodell et al. | |
| 7,843,380 B1 | 11/2010 | Woodell | |
| 2003/0160718 A1 * | 8/2003 | Nagasaku | 342/174 |
| 2004/0264549 A1 * | 12/2004 | Hoole | 375/141 |
| 2008/0018524 A1 * | 1/2008 | Christianson | 342/75 |
| 2008/0111731 A1 * | 5/2008 | Hubbard et al. | 342/160 |

OTHER PUBLICATIONS

Office Action for U.S. Appl. No. 12/180,293, mail date Jul. 28, 2010, 8 pages.

Office Action for U.S. Appl. No. 12/167,203, mail date Aug. 26, 2010, 9 pages.

Office Action for U.S. Appl. No. 12/180,293, mail date Jan. 4, 2011, 5 pages.

Skolnik, Merrill I., Introduction to Radar Systems, McGraw Hill Book Company, New York, 2001, 3rd edition, pp. 234-236.

U.S. Appl. No. 12/180,293, filed Jul. 25, 2008, Woodell et al.

* cited by examiner

RADAR ANTENNA STABILIZATION ENHANCEMENT USING VERTICAL BEAM SWITCHING

CROSS-REFERENCE TO RELATED APPLICATIONS

This application is related to U.S. Pat. No. 7,307,583, entitled "ANTENNA ADJUSTMENT SYSTEM AND METHOD FOR AN AIRCRAFT WEATHER RADAR SYSTEM", granted on Dec. 11, 2007 by Woodell, et al, U.S. patent application Ser. No. 12/167,203, entitled "SYSTEM FOR AND METHOD OF SEQUENTIAL LOBING USING LESS THAN FULL APERTURE ANTENNA TECHNIQUES", filed on an even date herewith by Woodell, and U.S. patent application Ser. No. 12/167,200, entitled "LESS THAN FULL APERTURE HIGH RESOLUTION PHASE PROCESS", filed on an even date herewith by Woodell, et al, all assigned to the Assignee of the patent application and incorporated in their entireties herein by reference.

BACKGROUND

The present disclosure relates generally to the field of radar systems. More specifically, the present disclosure relates to antenna position adjustment and/or calibration.

U.S. Pat. No. 6,424,288 invented by Daniel L. Woodell and assigned to the assignee of the present invention discloses a system for and methods of displaying radar information using weather radar systems. Weather radar systems generally include an antenna coupled to a receiver/transmitter circuit and a tilt control system. The tilt control system can be an entirely electronic system for directing radar signals from the antenna by electronically configuring the antenna or can be an electro-mechanical system that physically moves the antenna.

The tilt control system and the receiver/transmitter circuit are coupled to a processor. The processor provides transmit signals through the receiver/transmitter circuit to the antenna to transmit radar beams. The processor receives return signals derived from radar returns received by the antenna. The return signals are provided to the processor via the receiver/transmitter circuit.

The processor also provides signals to the tilt control system to control the position of the antenna. The position of the antenna can be adjusted with respect to its tilt angle. In addition, the tilt control circuit can allow adjustments to the elevation and roll of the antenna.

Current generation weather radar systems use automatic antenna tilt control to command antenna azimuth scans at desired elevation angles relative to the horizon of the weather radar system. As scans occur, aircraft orientation can change. The weather radar system can accommodate random components associated with aircraft orientation by receiving an indication of the aircraft orientation from sensors or other aircraft equipment. The radar system uses the aircraft orientation to correct antenna position so that the azimuth scan occurs across the horizon at a fixed elevation regardless of aircraft orientation.

To provide the most effective radar operation, the radar antenna should be positioned at known placements with respect to the aircraft. For example, to provide the most effective weather sensing operation, the weather radar antenna should be positioned at known placements with respect to the aircraft. All classes of automatic airborne weather radar systems have performance that is dependent upon the quality of the antenna beam position versus the environmental estimates of that position. These classes of automatic airborne weather radar systems include weather radar systems manufactured by Rockwell Collins, Inc., Honeywell International, Inc. and others.

Many factors can contribute to antenna placement or pointing errors (e.g., pointing errors with respect to the expected bore sight angle). Errors can be relatively dynamic and/or relatively constant. Some errors can be due to installation issues and mounting hardware tolerances. These errors tend to be relatively constant. Once detected, calibration with respect to errors due to installation issues and mounting hardware tolerances can be achieved.

Other pointing errors can be more dynamic. For example, airframes associated with aircraft can change shape due to pressurization, uneven heating, and loading. Applicants have found that these changes in shape of the airframe can affect the expected position of the antenna (especially the expected elevation, pitch, and roll position of the antenna). Other errors can be due to atmospheric phenomenon, such as the lensing effect associated with the atmosphere. Dynamic pointing errors and/or fixed errors can also occur due to errors associated with the sensing of the aircraft's orientation.

Heretofore, adjustment to antenna position has been performed in response to observed performance of the weather radar system. According to one conventional technique, the antenna or bore site is aimed from a known position to a known fixed target position. The actual return is analyzed to make adjustments to the antenna position. The antenna is manually or electronically trimmed to a more accurate position. According to another conventional technique, the antenna is positioned using optical tools.

Some aircraft have attitude sources (e.g., such as an attitude and heading reference system ("AHRS")). However, some of these sources are not accurate enough in a stand alone mode, to support weather radar operations (e.g., a MultiScan weather radar manufactured by Rockwell Collins, Inc.).

Thus, there is a need for a system for and a method of adjusting the position of an antenna for optimum weather radar performance. Further still, there is a need for real time or pseudo-real time adjustments to antenna position to compensate for dynamic errors associated with weather radar systems. Yet further, there is a need for a weather radar system optimized to determine antenna offset errors. Yet further still, there is a need for a system that automatically detects antenna offset errors and provides adjustment to the antenna. There is also a need for a weather radar system that can determine errors associated with the roll, elevation, and pitch of an antenna. There is also a need for a system and/or method to measure the angle from the aircraft to ground with high accuracy for weather radar operations.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to a method of adjusting a position of an antenna to reduce a position error. The method comprises receiving first data associated with first returns associated with a first portion of the antenna. The method further comprises receiving second data associated with second returns associated with a second portion of the antenna, wherein the first portion is different than, intersects with, or includes the second portion. The method further comprises determining the angle within the beam to the terrain using the first data and second data, whereby the angle is used to adjust or compensate for antenna position error.

Another embodiment of the present disclosure relates to a radar system coupled to a radar antenna for receiving radar returns and a radar control system for adjusting a position of the radar antenna. The radar system comprises a processor coupled to receive data associated with the radar returns. The processor receives first data associated with a first portion of the antenna and second data associated with a second portion of the antenna, wherein the first portion can be within, intersect with, or be exclusive of the second portion. The processor calculates the angle within the beam to the terrain using the first data and the second data, wherein the angle is used to adjust or compensate for antenna position error Yet another embodiment of the present disclosure relates to an apparatus. The apparatus comprises a radar antenna for receiving radar returns from a target. The apparatus further comprises means for receiving first data associated with first returns associated with a first portion of an antenna. The apparatus further comprises means for receiving second data associated with second returns associated with a second portion of an antenna, wherein the first portion includes, intersects, or is exclusive of the second portion. The apparatus further comprises means for determining an angle within the beam to the terrain using the first and second data and using the angle to adjust or compensate for antenna position error.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
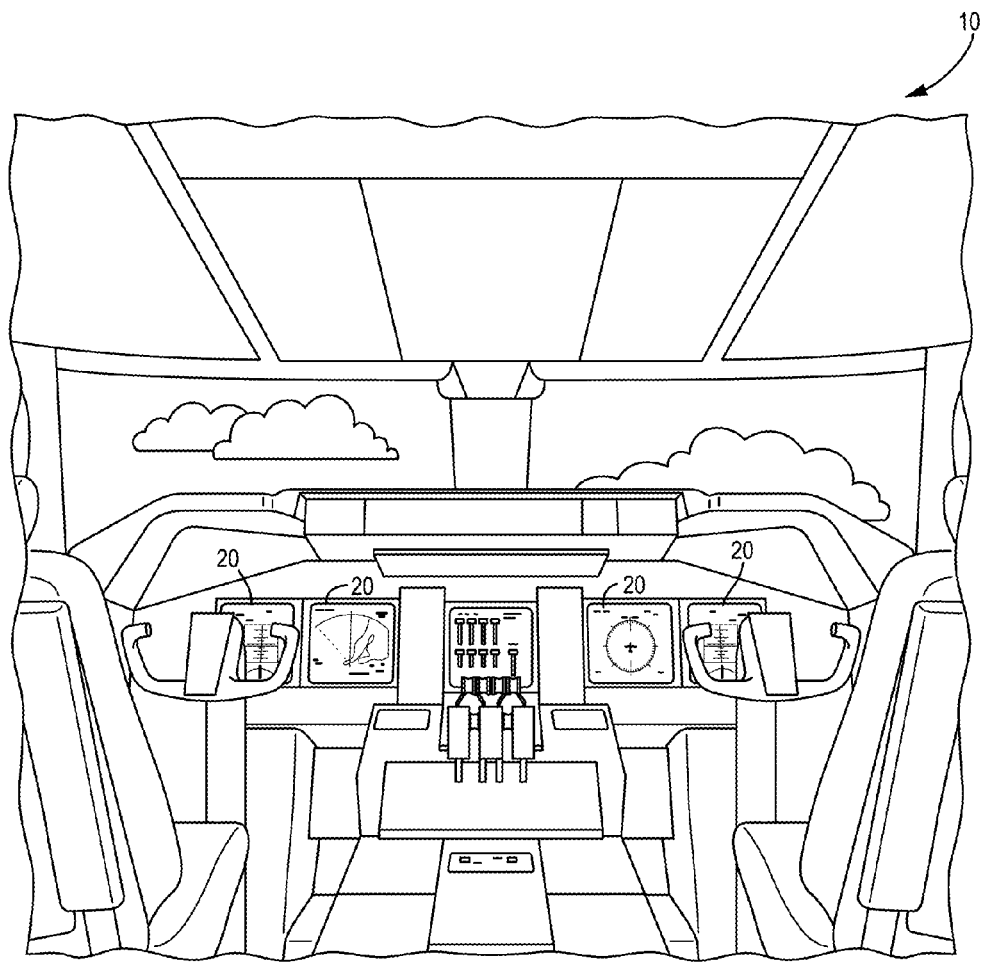
FIG. 1 is an illustration of an aircraft control center, according to an exemplary embodiment.

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20 which are used to increase visual range and to enhance decision-making abilities. In an exemplary embodiment, flight displays 20 may provide an output from a radar system of the aircraft.

Figure 2:
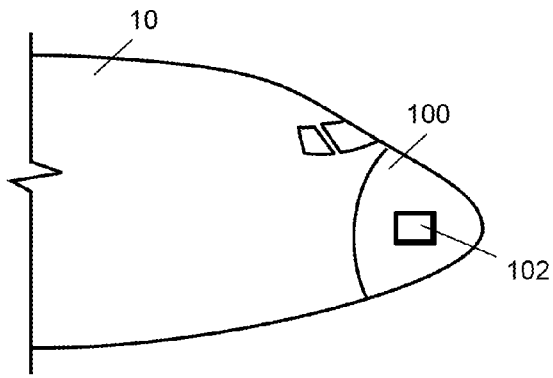
FIG. 2 is an illustration view of the nose of an aircraft including the aircraft control center of FIG. 1, according to an exemplary embodiment.

In FIG. 2, the front of an aircraft is shown with aircraft control center 10 and nose 100, according to an exemplary embodiment. A radar system 102 (e.g., a weather radar system) is generally located inside nose 100 of the aircraft or inside a cockpit of the aircraft. According to other exemplary embodiments, radar system 102 may be located on the top of the aircraft or on the tail of the aircraft. Radar system 102 may include or be coupled to an antenna system.

Figure 3:
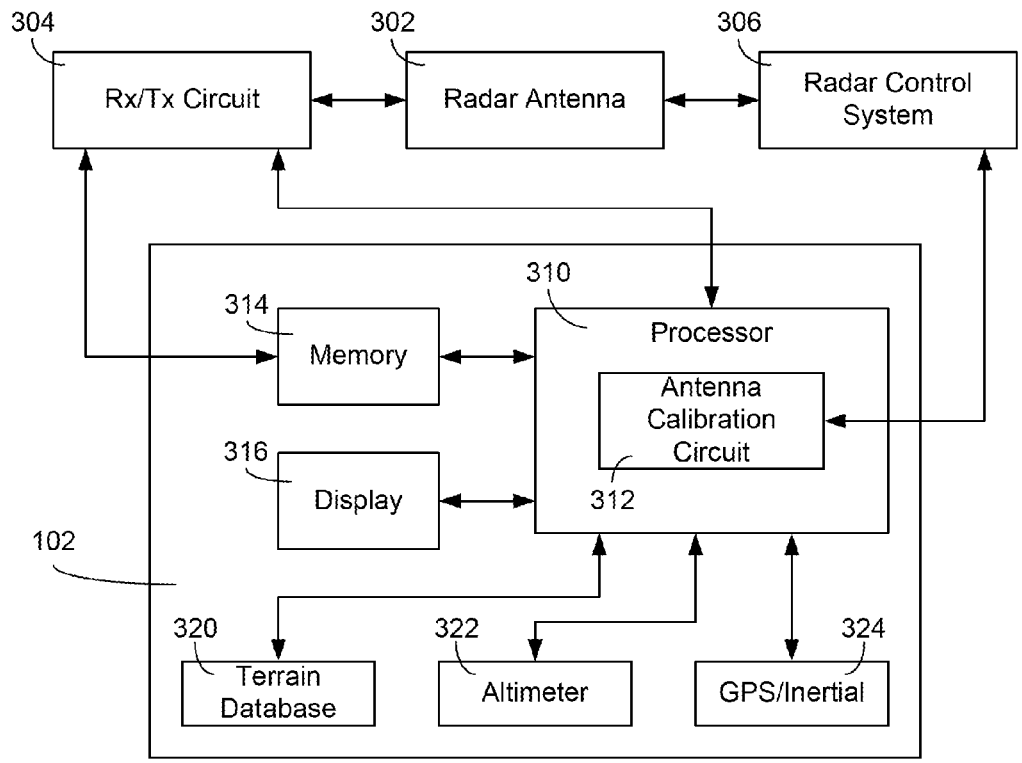
FIG. 3 is a block diagram of a radar system and radar antenna, according to an exemplary embodiment.

Referring to FIG. 3, a block diagram of radar system 102 (e.g., a weather radar system) is shown, according to an exemplary embodiment. Radar system 102 may be similar to the system described in U.S. Pat. No. 6,388,608 configured to include an antenna position error correction system as shown and described. The type of weather radar system is not disclosed in a limiting fashion. The principles of the present disclosure are applicable to any aircraft weather radar system or other radar system in which adjustments to an antenna position are desirable.

Radar system 102 may be coupled to radar antenna 302 via a receiver/transmitter circuit 304. Radar system 102 is optimized to adjust or refine pitch and roll associated with radar antenna 302. Radar system 102 advantageously provides antenna position calibration or adjustments by using measurements of angle to ground and comparing those measurements with known aircraft position and altitude.

Radar control system 306 may be a mechanism that can adjust radar antenna 302 in accordance with signals from antenna calibration circuit 312 of processor 310. Radar control system 306 may include controls for manually or automatically controlling the tilt angle, elevation, and pitch of radar antenna 302. Radar control system 306 may implement changes to radar antenna 302 via electronic configuration or via mechanically moving radar antenna 302. The particular technique for adjusting or trimming the position of radar antenna 302 and/or the direction at which radar antenna 302 is aimed is not discussed in a limiting fashion.

Antenna calibration circuit 312 is shown within processor 310. However, according to other exemplary embodiments, circuit 312 may be a separate circuit or separate software. Circuit 312 may be operated in conjunction with the operations of processor 310 or separately from the operations of processor 310. Circuit 312 may be embodied as its own software routing operating on its own platform. According to other exemplary embodiments, other processing electronics may be used in place of circuit 312. Antenna calibration circuit 312 preferably calculates errors associated with the position of radar antenna 302 and adjusts the position of radar antenna 302 in accordance with the errors. Circuit 312 may compensate for at least one of an elevation error, trim control error, pitch error, and/or roll error. Alternatively, circuit 312 may calculate other types of positioning errors and provide the appropriate adjustment via radar control system 306.

According to yet another alternative, circuit 312 can compensate for positioning errors without mechanically adjusting antenna 302. In one embodiment, thresholds associated with returns are adjusted according to the positioning errors. Other signal and return parameters can also be adjusted to correct for positioning errors. According to one example, return power levels can be adjusted to compensate for positioning errors. Alternatively, adjustments can be made when graphical images are displayed to compensate for positioning errors. In this way, circuit 312 can compensate for positioning errors without requiring mechanical adjustment.

According to one embodiment, circuit 312 receives radar returns and determines a range to the Earth's surface (e.g., ground). In one exemplary embodiment, the range calculated is based upon a ratio of radar beams from a multiple tilt angle radar system. Circuit 312 calculates the ratio of return power between two antenna beams. The ratio of return power is used to estimate the angles to the average range of the sample region. Circuit 312 additionally determines angles to the average range of the sample region to the Earth's surface based upon geographic parameters (e.g., information not derived from the radar returns utilized to determine the range to the Earth's surface). Geographic parameters may include location and altitude. Geographic parameters may be derived from a terrain database 320, altimeter 322, a GPS or inertial navigation system 324, Earth models, other navigational aids, or any combination thereof. Preferably, the angles to the average range of the sample region derived from the geographic parameters are expressed as a function of the ratio of more than one radar return.

Circuit 312 compares the two radar return ratios to determine an error associated with the position of radar antenna 302. The error may be expressed in terms of offsets to antenna position. In one embodiment, the offsets are an elevation offset, a pitch offset, and a roll offset (collectively, offset data). The offset data is stored in memory 314 and provided to radar control system 306 to adjust the position of radar antenna 302. In a preferred embodiment, processor 310 can receive the offset data and provide the position control signals to radar control system 306 with adjustments made to the position control signals in accordance with the offset data. In an alternative exemplary embodiment, the offset data may be provided directly to radar antenna 302.

Circuit 312 may periodically determine the error and calculate the offset data for radar control system 306. According to one exemplary embodiment, the offset data can be calculated every four seconds and stored in memory 314 after each calculation. Alternatively, circuit 312 may calculate the offset data at every radial, at the end of an entire scan, every two seconds, or at other events when data is complete enough for the error functions and yet the calculations do not interfere with the other functions of system 102. Alternatively, the error data can be stored rather than the offset data.

In one embodiment, a running average of the offset data is stored in memory 314. If circuit 312 determines that an error calculation or offset calculation is invalid or disqualified, circuit 312 can use a stored error or offset stored data from memory 314. In this way, antenna calibration circuit 312 ensures that radar antenna 302 has its position adjusted in accordance with the most recent valid offset data or a running average of valid offset data. The offset data and/or error data can also be provided to display 316 for viewing by the pilot, maintenance personnel, or others. The offset data or the error data provided can be display 316 as display 316 provides graphical images associated with weather radar data. In one embodiment, the graphical images are adjusted according to the offset data or error data so the positioning of antenna 102 does not need adjustment. In this embodiment, the offset or errors can be corrected by offsetting or correcting the position of the graphical images on the display to correct or compensate for the positioning errors associated with antenna 102.

Processor 310 may be a weather radar return processing unit configured to receive radar returns and determine an angle from the aircraft to ground with high accuracy, among other tasks. According to an exemplary embodiment, the radar returns received may be weather radar returns. Processor 310 may receive first data associated with a first portion of the antenna and second data associated with a second portion of the antenna. Further, according to some exemplary embodiments, processor 310 may receive third data associated with the first portion of the antenna and fourth data associated with the second portion of the antenna. Processor 310 is coupled to a display 316 (e.g., a display such as or similar to display 20 of FIG. 1). Processor 310 may be configured to calculate standard deviations of wind velocities, to generate turbulence alerts, and to provide a display signal to display 316.

In a preferred embodiment, processor 310 and circuit 312 are implemented in software subroutines. The subroutines can be executed on one or more digital signal processors associated with radar system 102.

In operation, processor 310 provides signals, either directly to receiver/transmitter circuit 304 or indirectly through memory 314, to provide radar beams at radar antenna 302. Preferably, processor 310 is configured to operate radar system 102 as a multi-scan, multi-tilt angle radar system, or a volumetric radar system in which radar beams are produced at more than one tilt angle. Processor 310 receives radar returns directly through receiver/transmitter circuit 304 or indirectly through memory 314. Receiver/transmitter circuit 304 may be a single path or may have separate circuits for a receive path and transmit path.

Display 316 may be configured to provide a graphical representation of radar returns received by processor 310. According to one exemplary embodiment, display 316 may provide color graphical images corresponding to the intensity of the radar returns. The graphical images may represent weather regions, rainfall densities, turbulence regions, etc. Display 316 may also include an additional signal scan smoothing memory. The memory is used to store one scan and limit the display of radically different data on the next sweep which is done at the same tilt angle.

Memory 314 may refer to a single or several storage devices configured for storing data and/or computer code for completing and/or facilitating the various processes described in the present disclosure. Memory 314 may include volatile memory and/or non-volatile memory. Memory 314 may be memory included with the hardware platform associated with radar system 102. Memory 314 may be any distributed and/or local memory device of the past, present, or future. Memory 314 is communicably connected to processor 310.

The details of radar system 102 are provided in an exemplary fashion. The principles of the present disclosure are applicable to any radar system (e.g., a weather radar system) utilizing radar data for a display. The various components and circuits as described may be implemented in various hardware and software configurations depending upon design parameters and system criteria. The embodiment of FIG. 3 may be used for methods 400-700 of FIGS. 4-7 to adjust the radar antenna for sufficient use.

Figure 4:
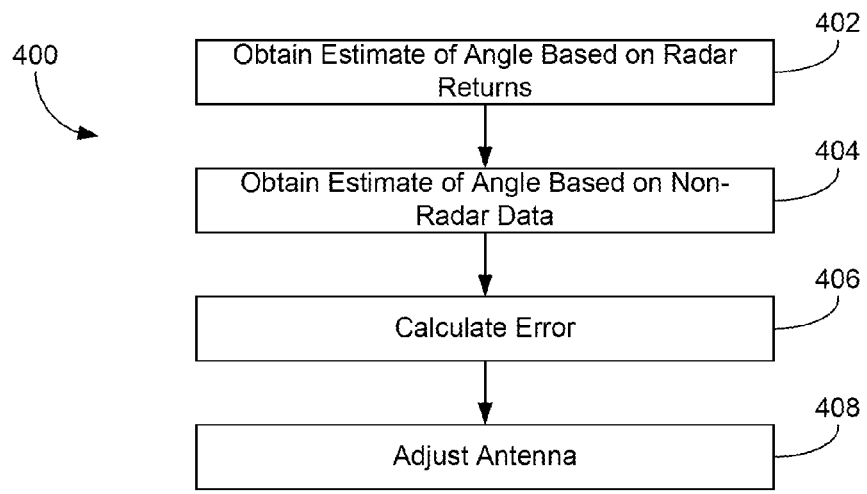
FIG. 4 is a flow diagram of a method of using the radar system of FIG. 3 to adjust the radar antenna of FIG. 3, according to an exemplary embodiment.

Referring to FIG. 4, a flow diagram of a method 400 of an exemplary operation of radar system 102 is shown, according to an exemplary embodiment. An estimate of the angle from the bore site of the radar antenna to a fixed target is made (step 402). The estimate is based upon radar returns and the fixed target may be a location on the surface of the Earth. An estimate of the angle from the bore site to the fixed target is made based upon non-radar data (step 404). Non-radar data can be geographical data (e.g., altitude and position data from database 320, altimeter 322, systems 324, etc.). The estimate of the angle from the bore site to the fixed target based upon radar returns is compared to the estimate of the angle from the bore site to a fixed target based upon non-radar data and an error is calculated (step 406). The position of the radar antenna is adjusted via radar control system (step 408).

Figure 5:
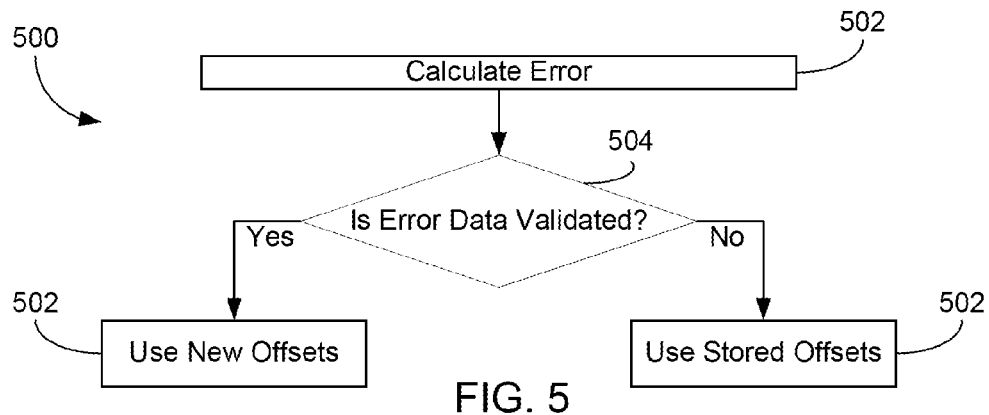
FIG. 5 is a flow diagram of a method of using the radar system to determine new offsets, according to an exemplary embodiment.

Referring to FIG. 5, a flow diagram of a method 500 of using radar system 102 to determine new offsets is shown, according to an exemplary embodiment. An error associated with antenna position is calculated (step 502) (e.g., via step 406 of FIG. 4 or otherwise). The error data is validated (step 504). Preferably, the error is validated by comparing the error with respect to reasonable inferences of error. In addition, portions of the error can be compared to other portions to determine the legitimacy of the error. For example, the error may be expressed as vector data. Data within the vector data may be compared to determine legitimacy of the data.

If the data is deemed to be valid at step 504, new offsets are calculated utilizing the error data and used by processor 310 to position antenna 302 or provided directly to radar control system 306 to adjust antenna 302 (step 506). If the data is not validated at step 504, radar system 102 utilizes stored offset data or values (such as a running average or the last previous validated data) to adjust the position of radar antenna 302 (step 508).

By continually operating method 500, the error is continuously analyzed and accommodated. In this way, a single sample of data does not adversely affect the operation of radar system 102 during an entire flight. Radar system 102 preferably operates in real time or near real time.

Figure 6:
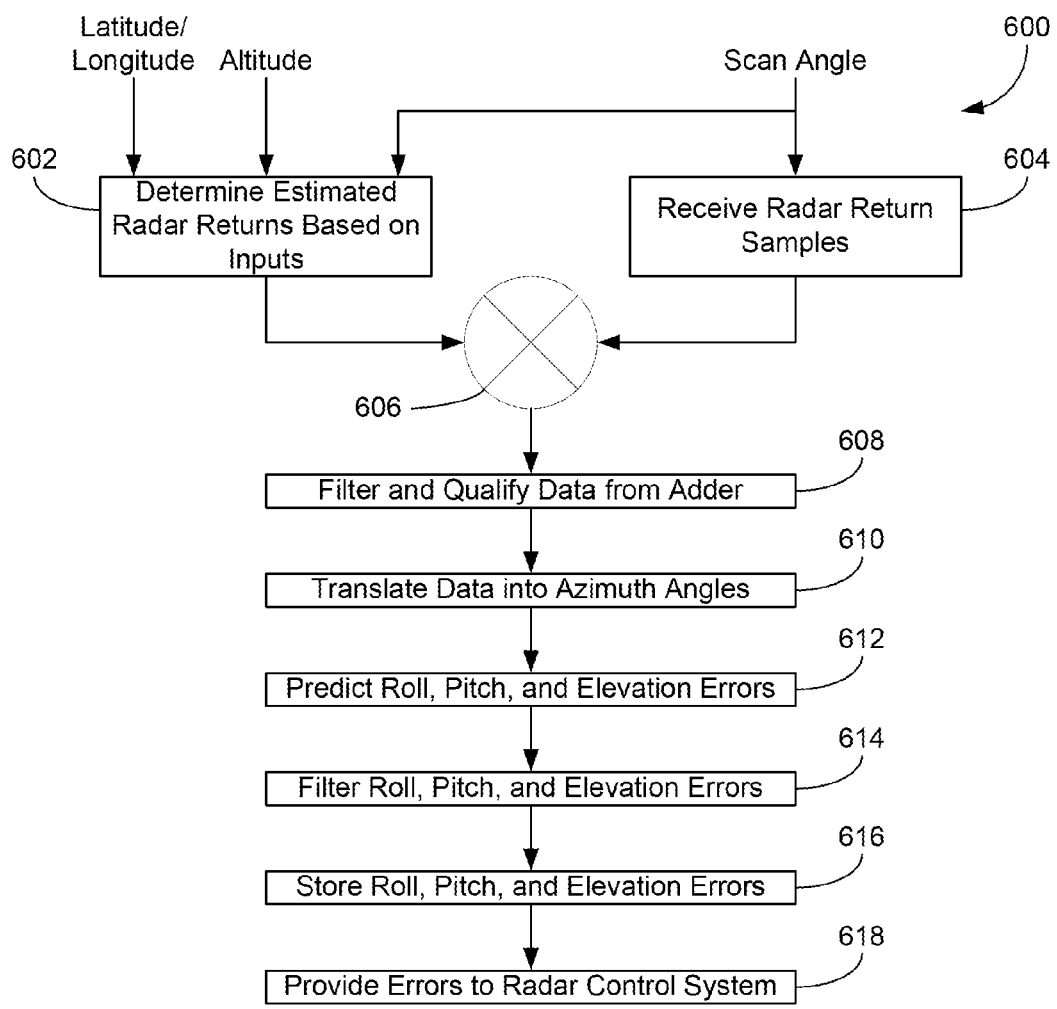
FIG. 6 is a flow diagram of a method of using an antenna calibration circuit, according to an exemplary embodiment.

Referring now to FIG. 6, a flow chart of a method 600 of the operation of antenna calibration circuit 312 is shown, according to an exemplary embodiment. Circuit 312 determined estimated radar returns based upon inputs regarding the latitude, longitude, and altitude of the aircraft (step 602). The altitude may be a corrected altitude, an above ground level ("AGL") parameter derived from altimeter 322 or another source (e.g., GPS), etc. Radar return samples are received from receiver/transmitter circuit 304 (step 604). The radar return samples are performed at a scan angle across a radial, according to an exemplary embodiment. The estimated radar returns from step 602 are associated with the samples of step 604 and may be compared together to determine an error in the form of vector error data (step 606).

The vector error data is filtered and qualified (step 608). All available data points within the error vector are averaged to produce a single low variance mean error value. At the same time, the variance of the error vector is computed. Variance is used as a quality control term that allows good data vectors to be used in the antenna adjustment process and poor error vectors to be excluded from the process. According to one exemplary embodiment, step 608 may include comparing the error data associated with a number of sectors in each scan. If a number of sectors in the scan quality, that data is utilized. If not, the data from the entire scan is not utilized.

The filtered and qualified error data is translated into azimuth angles and stored (step 610). The filtered and qualified error data is merged into a model of tilt angle error versus azimuth angle. Alternatively, the model can be in any coordinate system (e.g., Cartesian, Rho and Theta, etc.).

Roll, pitch, and elevation errors may be predicted using the data from step 610 (step 612) by solving the tilt error model at +/−90 degree and 0 degree scan angle locations. The roll error equals ½ of the tilt error model solved at 90 degrees minus ½ the roll error solved at −90 degrees. The elevation error equals ½ the roll error solved at 90 degrees and ½ the error solved at −90 degrees. The pitch error equals the elevation error minus the tilt error solved at 0 degrees.

The roll, pitch, and elevation error predictions are filtered (step 614). The filtered error predictions are stored in a non-volatile memory (step 616). The stored error predictions may be utilized when radar system 102 is initialized (e.g., at start-up, at the beginning of each flight, etc.). In addition, the error predictions are provided as roll, pitch, and elevation offset vectors to radar control system 306 (step 618). Alternatively, the offset vectors may be provided to processor 310 which adjusts control signals to radar control system 306 in accordance with the offsets.

Figure 7:
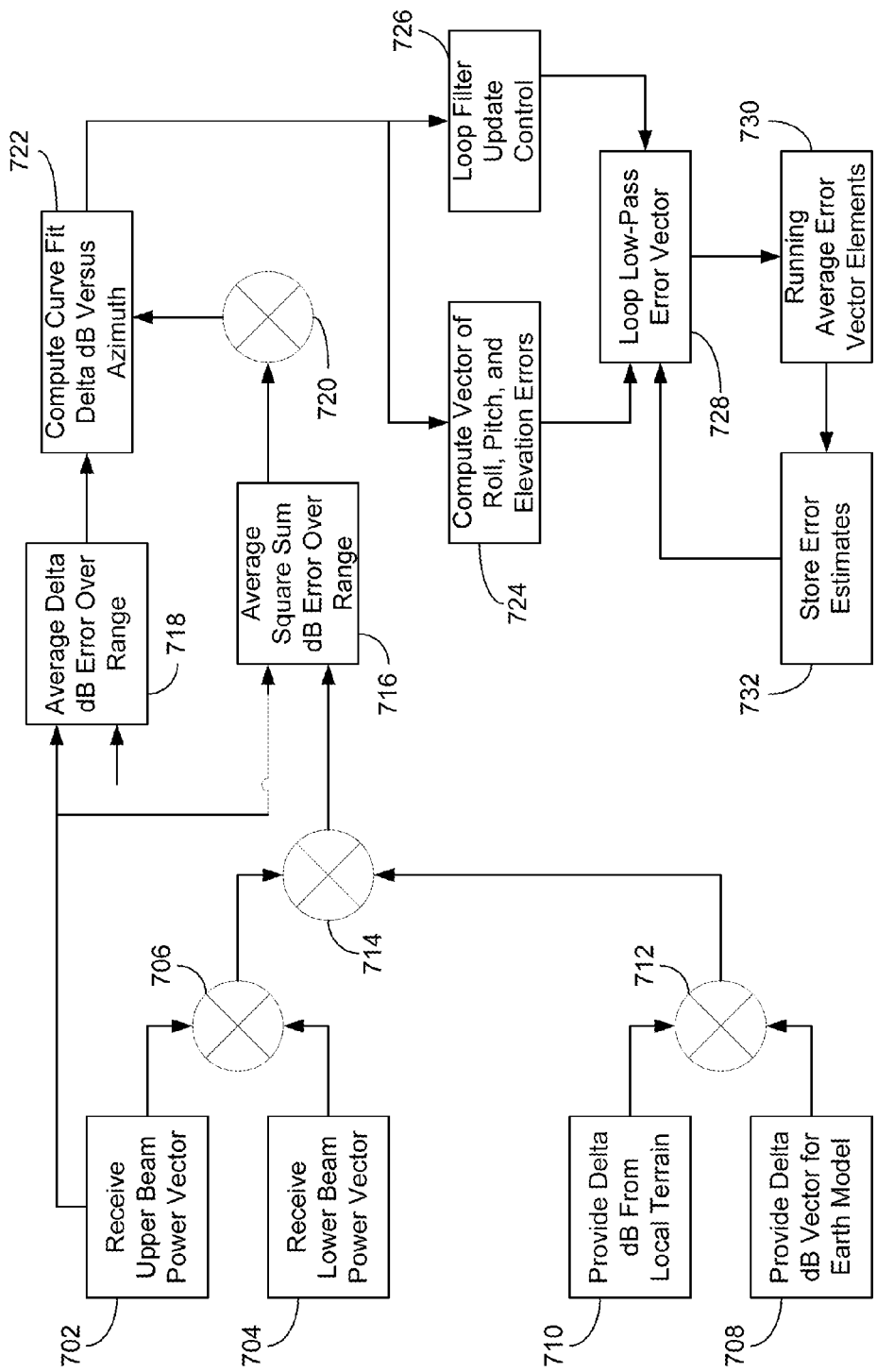
FIG. 7 is a more detailed flow diagram of a method of using an antenna calibration circuit, according to an exemplary embodiment.

Referring now to FIG. 7, a flow diagram of a method 700 of using antenna calibration circuit 312 is shown, according to an exemplary embodiment. An upper beam power vector and a lower beam power vector is received (steps 702 and 704). According to one exemplary embodiment, the power vectors may be read from XY memory from memory 314 of radar system 102. XY memory refers to a mechanism where radar return power estimate data may be stored in a Cartesian form. The power vectors are provided to a vector adder 706 and compared to determine a power ratio. Preferably, the upper beam power vector and lower beam power vector are provided as data in a logarithmic form (decibel (dB) reference). Subtracting the upper beam power vector from the lower beam power vector in vector adder 706 results in a power ratio (e.g., delta dB). The power ratio is indicative of the angle within the beam to the terrain.

Preferably, steps 702-704 utilize ranges in accordance with a relationship with altitude. For example, at an altitude from 10,000 feet to 20,000 feet, ranges of 33-65 nautical miles are utilized. For altitudes of 20,000 feet to 30,000 feet, ranges of 65-90 nautical miles are utilized, and for altitudes of 30,000 feet to 50,000 feet, ranges of 90-166 nautical miles are utilized.

In one exemplary embodiment, radar system 102 is a multi-scan weather radar system that utilizes dual beam operation to differentiate weather from ground clutter by computing the difference in power vectors from an upper and lower beam according to steps 702-704. Advantageously, these dual beam processes are driven from the difference in return power from two or more beams, thereby reducing sensitivity to the absolute level of power (only the ratio between the two beams is utilized). According to another embodiment, a volumetric radar scan using multiple beams to probe the environment can be utilized to determine angle to ground targets.

A delta dB vector associated with an Earth model is provided to vector adder 712 (step 708). According to one exemplary embodiment, the Earth model is a 4/3 diameter Earth model which corrects for index of refraction due to the atmosphere. The Earth model uses the latitude and longitude and the altitude of the aircraft.

A delta dB vector associated with local terrain is provided to vector adder 712 (step 710). The delta dB vector may be provided from a local terrain database (e.g., database 320). Step 710 advantageously reduces errors in the estimation of antenna errors when steps 702-704 sense ground clutter produced by non-flat ground clutter. In one embodiment, local terrain database 320 provides offsets associated with hills, valleys, or other small deviations associated with the Earth's surface. Alternatively, other devices can be utilized to provide an indication of local terrain.

The delta dB vector associated with the local terrain is provided to vector adder 712. The delta dB vector associated with local terrain is combined with the delta dB vector for the Earth model and provided to a vector adder 714 which receives the difference of the upper beam power vector and the lower beam power vector from vector adder 706.

The difference of the ratio of the upper beam to the lower beam and the difference of the delta dB vector for the Earth model and the delta dB vector from local terrain is provided to steps 716 and 718. Utilizing the upper beam power vector, the square sum dB error over the range is averaged (step 716) and the delta dB error corrected for terrain over the sample range is averaged (step 718).

The variance of the corrected delta dB error vector is computed in step 716. The computed variance is used as a quality control term. The amount of variation in the delta dB error data is minimized in steps 716-718. The delta dB error vector is preferably averaged in range with a first order least mean square ("LMS") fit over a fixed sample range.

The average square sum dB error over the range is provided to vector adder 720. Vector adder 720 additionally received an input from the usable sum square error threshold. Vector adder 720 removes unwanted radials for step 722.

A curve fit delta dB versus azimuth is computed (step 722) both as a low pass filter function operating across azimuth and as an input to a final quality control function that computes the square sum error between the fit and the input data. Data sets that produce large square summed residuals between the fit and the input data are disallowed from modifying the current antenna adjustment set since large sum squared errors are indicative of a poor quality curve fit or weather contamination. The output of step 722 can be expressed as fit coefficients.

The decision to use or not to use the average delta dB error is done by comparator or vector adder 720 by comparing the information variance of the corrected delta dB error from step 716 to a threshold. The threshold is set to a level that allows normal variations associated with clutter to be used in step 722. Radials that are contaminated by weather generally produce large variances of the corrected delta dB vector. Contaminated vectors are preferably excluded from the antenna adjustment process when their estimate variance exceeds a threshold value. The threshold value is preferably set to not disqualify returns that exhibit the normal variation in terrain returns.

A second order LMS fit across azimuth is utilized (in step 722). Errors due to beam elevation position are generally fixed or slowly varying and can be reasonably modeled by a second order fit. The second order fit in azimuth both averages in azimuth and models the typical errors found in elevation.

Roll, pitch and elevation errors are predicted from the fit coefficients produced in step 722 by solving the delta dB line fit at +/−90 degree and 0 degree scan angle locations (step 724). The roll error equals ½ of the tilt error model solved at 90 degrees minus ½ the roll error solved at −90 degrees. The elevation error equals ½ the roll error solved at 90 degrees and ½ the error solved at −90 degrees. The pitch error equals the elevation error minus the tilt error solved at zero degrees.

These errors are low pass filtered to slow down changes (step 728) and provided to radar system 102. A loop filter update control for controlling the filtering in step 728 may be provided by a step 726. Step 726 is utilized with maneuver information to provide control of step 728. A running average of the error vectors are calculated (step 730). The running average is stored in memory (e.g., non-volatile memory of memory 314) (step 732).

Figure 8:
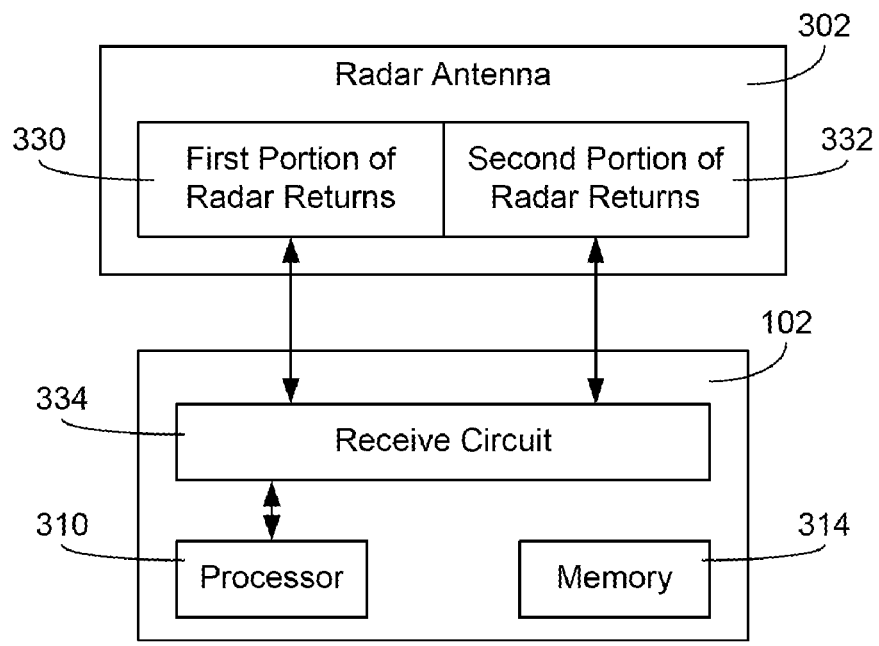
FIG. 8 is a block diagram of a radar system and radar antenna, according to an exemplary embodiment.
Figure 9:
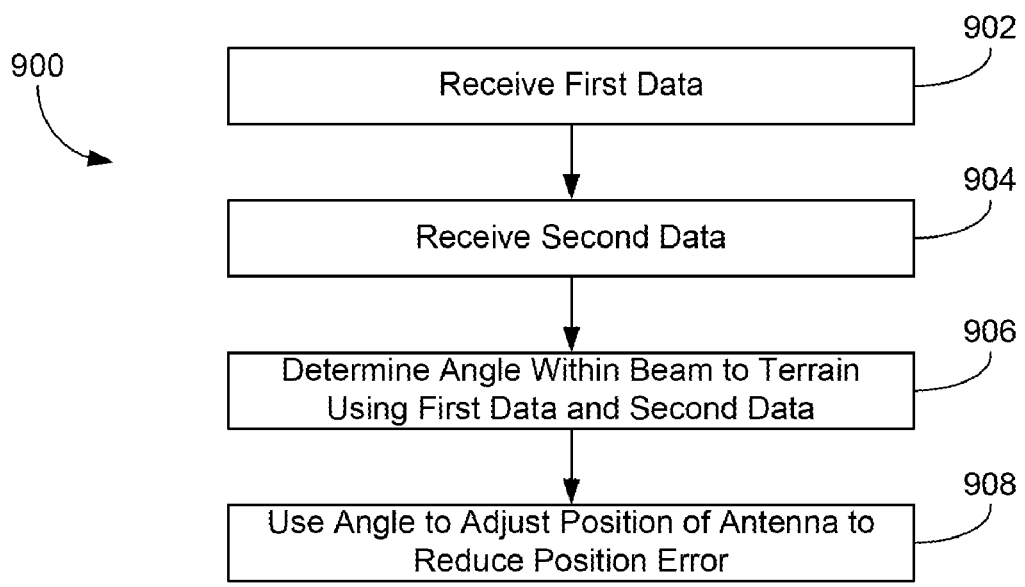
FIG. 9 is a flow diagram of a method of determining an angle within the beam to terrain to use to determine an antenna adjustment, according to an exemplary embodiment.
Figure 10:
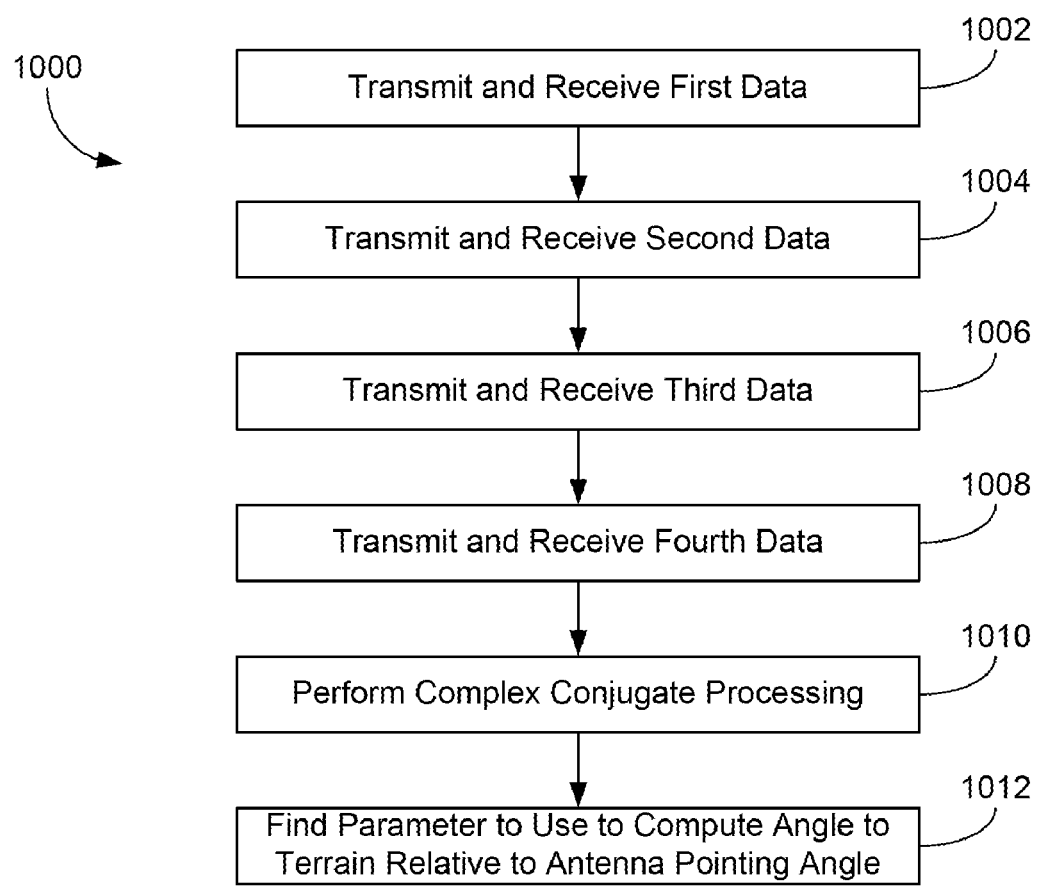
FIG. 10 is a flow diagram of a method of using complex conjugation, according to an exemplary embodiment.

Methods 400-700 of FIGS. 4-7 may be used to adjust the radar antenna of the radar system, according to an exemplary embodiment. The methods use an estimated angle within the beam to the ground to determine an adjustment for an antenna position based off of errors. Referring generally to FIGS. 8-10, systems and methods for determining or calculating the angle within the beam to the ground are shown, according to various exemplary embodiments. The angle may be used in various steps of methods 400-700 to determine errors and antenna adjustments as described in the methods.

Referring now to FIG. 8, a block diagram of weather radar system 102 coupled to radar antenna 302 is shown, according to an exemplary embodiment. Radar antenna 302 includes a first portion 330 of antenna 302 and a second portion 332 of antenna 302. Radar antenna 302 may receive radar returns from a target. In an exemplary embodiment, the radar returns received by radar antenna 302 can be separated into two or more portions 330 and 332. First portion 330 of the returns may relate to data from one area, while second portion 332 of the returns may relate to a second area. For example, second portion 332 may be a bottom half or top half of the antenna. As another example, second portion 332 may be any half of the antenna, or other sized portion of the antenna. Similarly, first portion 330 can be the entire antenna or other sized portion. According to an exemplary embodiment, second portion 332 includes first portion 330.

According to other exemplary embodiments, the first and second portion may be a bottom half, a top half, a left half, a right half, or a whole of the antenna. For example, the first portion may relate to transmitting on the full aperture (sum) and the second portion may relate to transmitting on a half aperture. As another example, the first portion may relate to a half aperture and the second portion may relate to a full aperture. As yet another example, both the first portion and second portion may be either a full aperture or half aperture. Further still, the half aperture can be any other fraction of a full aperture and the full aperture can be any fraction of the full aperture so that the combination gives an apparent change of the phase center. Any combination of the first portion and second portion that gives an apparent change in the phase center may be used. The first portion is preferably not identical to the second portion. The first portion can intersect, include, or be exclusive of the second portion.

A first pulse may be provided before sampling the first returns associated with first portion 330, and a second pulse may be provided before sampling the second returns associated with second portion 332. This cycle of pulse and returns can be repeated. The first and second pulses can be full aperture pulses. The full aperture receive data may be used to allow full aperture and half aperture data to be separated.

According to one embodiment, a full aperture coded pulse may be provided for the first data and a half aperture coded pulse may be provided for the second data. The first data and second data received may be associated with full aperture received data, according to an exemplary embodiment. According to another exemplary embodiment, a one third aperture may be used instead of a half aperture. According to yet another exemplary embodiment, a two thirds aperture may be used instead of a half aperture. According to yet other exemplary embodiments, the aperture may be separated in various ways other than a top half and a bottom half or a left half and a right half, and the aperture may be separated unevenly (e.g., not in two halves).

Radar system 102 may include a receive circuit 334 or other circuit configured to receive first data from first portion 330 and second data from second portion 332 and to provide the data to processor 310. In this embodiment, the first data and second data are associated with the first and second portion, respectively, because the first data and second data are derived from returns received by the first and second portion, respectively. Alternatively, the first data and second data can be associated with the first and second portion, respectively, because the first data and second data are derived from returns associated with transmissions from the first and second portion, respectively.

According to one exemplary embodiment, the first data and second data may be derived from coded radar pulse transmissions. According to another exemplary embodiment, coding is not required. For example, one system may transmit on the sum and receive on the sum, followed by an independent transmit on the sum and receive on the half aperture, where the pulse sample time does not overlap. Therefore, coding is not required for the transmissions. In "busier" radars, the limited scan time may lead to overlapping of sampling the different portions of the aperture, therefore requiring the use of different coded transmissions.

According to one exemplary embodiment, a third data associated with third returns associated with first portion 330 may be received. Additionally, a fourth data associated with fourth returns associated with second portion 332 may be received. An angle within the beam to the target may be calculated using the first return vector determined using first data, the second return vector determined using second data, the third return vector determined using third data, and the fourth return vector determined using fourth data. A third pulse may be provided before sampling the third returns, and a fourth pulse may be provided before sampling the fourth returns. The first, second, third, and fourth pulses may be full aperture pulses or otherwise. The number of pulses are not disclosed in a limited fashion. Various numbers of pulses can be utilized.

Referring to FIG. 9, a flow diagram of a method 900 of determining an angle within the beam to the terrain is shown, according to an exemplary embodiment. Advantageously, method 900 reduces the busy radar problem associated with solutions that mechanically "dip" the antenna at several azimuths to measure angle to the ground. Preferably, method 900 utilizes the sub-aperture techniques to electronically switch beams in the vertical axis or uses electronically scanned antenna ("ESA") techniques to electronically switch the antenna beams in the vertical axis. The phase differences from these beams can be used to measure the angle with a high degree of accuracy as explained in the disclosure. The angles are used to provide refinements to pitch and roll to stabilize the antenna sufficiently for volumetric or multi-scanning radar operations.

According to method 900, first data associated with first returns associated with a first portion of the antenna is received by the radar system of an aircraft (step 902). Second data associated with second returns associated with a second portion of the antenna is received (step 904).

The returns can be associated with a particular portion because they are received or transmitted by that portion. For example, a pulse may be transmitted by a half aperture and received by a full aperture or be transmitted by a full aperture and received by a half aperture with the same effect according to the principles of the embodiments of present invention.

According to an exemplary embodiment, the first portion is different than, intersects with, or includes the second portion. According to one exemplary embodiment, the data received in steps 902-904 is representative of a range derived from a ratio of an upper radar beam and a lower radar beam. According to an exemplary embodiment, the first data and second data may be received for different azimuth angles (e.g., the antenna angle to the terrain is different for the first data and second data). Using the first data and second data, an angle within the beam to the terrain may be determined (step 906). Using the resulting angle, the position of the antenna may be adjusted to reduce or eliminate a position error (step 908).

Step 906 of method 900 may include determining a vector associated with the first data and second data and using a complex conjugate method to determine an angle within the beam to the terrain. The calculations of step 906 is shown in greater detail in FIG. 10. According to other exemplary embodiment, methods other than the complex conjugate method may be used to determine the angle within the beam to the terrain.

Referring now to FIG. 10, a flow diagram of a method 1000 of using complex conjugate calculations to determine an angle is shown, according to an exemplary embodiment. First data through fourth data may be received by the processor of the radar system (steps 1002-1008) on a first pulse through fourth pulse. According to one exemplary embodiment, the radar system may transmit on the full aperture and receive on the sum beam on the first pulse, followed by transmitting on the full aperture and receiving on the half aperture for the second pulse, followed by transmitting on the full aperture and receiving on the sum beam for the third pulse, followed by transmitting on the full aperture and receiving on the half aperture for the fourth pulse. According to other exemplary embodiment, various patterns of transmitting on full aperture and half apertures may be used (e.g., the system may alternative transmitting on the full aperture and half aperture, while the system receives on the full aperture). Additionally, any less-than-full aperture may be used instead of a half aperture. Alternatively, a three pulse pattern or other pattern may be used instead of the four pulse pattern of method 1000 of FIG. 10.

In step 1002, on the first pulse, the system may receive a power vector $V_S$ (for the full aperture) and an angle $\phi$. The sampled return from the first pulse may be represented by the equation (in polar coordinates): $P1=(V_S, \angle(\phi))$. The nomenclature represents a voltage signal associated with the energy of the received return. The voltage signal is expressed as a vector and represents power associated with the radar return. $V_S$ is the magnitude of the vector while 0 is the argument or phase of the vector.

In step 1004, on the second pulse, a half aperture power vector $V_H$ is received (for the half-aperture or upper beam). Also received is the same arbitrary angle $\phi$ of step 1002 plus a change in the phase due to movements between the pulses (represented by the variable "PhiDoppler") and a change in the phase due to the shift in the phase center (represented by the variable "PhiOffset"). The change in phase of PhiDoppler is caused by relative movement of the target between the pulses. The sampled return from the second pulse may be represented by the equation:

$$P2=(V_H, \angle(\phi+\text{PhiDoppler}+\text{PhiOffset})).$$

In step 1006, on the third pulse, a power vector $V_S$ is received. The power vector received is equal to the power vector received in step 1002. The Doppler continues to rotate through because phase changes are being accumulated from the Doppler. For the third pulse, the change in phase due to the Doppler may be doubled compared to the change in the second pulse of step 1004. Therefore, the sampled return from the third pulse may be represented by the equation:

$$P3=(V_S, \angle(\phi+2*\text{PhiDoppler})).$$

In step 1008, a power vector $V_H$ may be received which is equal to the power vector received in step 1004. The fourth pulse may be similar to the second pulse, except the Doppler continues to rotate. For the fourth pulse, the change in phase due to the Doppler may be tripled compared to the change in the second pulse of step 1004. The sampled return from the fourth pulse may be represented by the equation: $P4=(V_H, \angle(\phi+3*\text{PhiDoppler}+\text{PhiOffset}))$. The four pulses of steps 1002-1008 may be closely spaced such that high correlation between the pulse returns is maintained.

Complex conjugate processing is performed (step 1010). A value $P_A$ may be found by multiplying P1 times the conjugate of P2 (the first and second pulse):

$$P_A=P1*\text{conj}(P2)=(|V_S|*|V_H|, \angle(-\text{PhiDoppler}-\text{PhiOffset})).$$

A value $P_B$ may be found by multiplying P2 times the conjugate of P3 (the second and third pulse): $P_B=P2*\text{conj}(P3)=(|V_H|*|V_S|, \angle(-\text{PhiDoppler}+\text{PhiOffset}))$.

A value $P_C$ may be found by multiplying $P_A$ times the conjugate of $P_B$:

$$P_C=P_A*\text{conj}(P_B)=(|V_H^2|*|V_S^2|\angle(2*\text{PhiOffset}))$$

In the previous equation, for the angle component of $P_C$, the values for $\phi$ and PhiDoppler cancel out, and the only variable of the angle component remaining is two times the phase center shift. The variable PhiOffset may be solved for using the equation $$PhiOffset = \left(\frac{1}{2} * \arctan(P_C)\right).$$

The remaining value of the angle component may be used as a parameter for computing the angle to target relative to the antenna pointing angle (step 1012). The phase shift is a direct function of the steering angle inside the real beam. For example, for a 12 inch antenna operated at 9.3 GHz, in the value of the phase of $P_C$, 10 degrees of phase shift represents one degree of target angle change. In other words, for every degree by which the phase change is off, the beam center is off by $1/10^{th}$ of a degree (e.g., $1/10^{th}$ of a degree from normal to the surface of the antenna). This may be represented by the equation: PhiBeam=PhiOffset÷10, where PhiBeam is simply the target angle change.

Still referring to step 1012, the output of the set of conjugate multiplications of step 1010 produces a scaled version of the angle from the antenna pointing angle (the angle references to a vector normal to the surface of the antenna flat plate). Once scaling (via multiplication) is performed, the antenna pointing angle may be added to produce the angle within the beam to the target. If the antenna pointing angle is referenced to the local horizon (e.g., ground), the final angular value provided by method 1000 is the angle within the beam to the target referenced to the local horizon.

The resultant vector of the multiplications of step 1010 is in a full rectangular form, which allows the vector to be in a usable form to allow coherent integration (the addition of multiple vector estimates to produce a better final estimate) with similar vectors.

According to various exemplary embodiments, the process flow of FIGS. 4, 5, 6, 7, 9, and 10 may be embodied as hardware and/or software. In exemplary embodiments where the processes are embodied as software, the processes may be executed as computer code on any processing or hardware architecture or in any radar system.

The correlated responses associated with system 102 allow system 102 to require less filters and less latency. The responses are correlated because they are much closer together in time then conventional systems.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A method of adjusting a position of an antenna to reduce a position error, the method comprising:
    receiving first data associated with first returns associated with a first portion of an antenna;
    receiving second data associated with second returns associated with a second portion of the antenna, wherein the first portion is entirely different than, intersects with or includes the second portion, the first portion and the second portion not being the same, wherein the first portion includes all of the antenna or a portion of the antenna; and
    determining an angle to terrain using the first and second data, whereby the angle is used to compensate or adjust the position of the antenna to reduce the position error.

2. The method of claim 1, wherein the second returns associated with the second portion are associated with a half aperture and the first returns associated with the first portion are associated with a full aperture.

3. The method of claim 1 further comprising determining a first vector associated with a target on the terrain using the first data and a second vector associated with the target using the second data.

4. The method of claim 3 wherein the complex conjugate between the first vector and the second vector is used to determine an angle within a beam to the terrain with known Doppler.

5. The method of claim 1 further comprising:
    providing a first pulse before sampling the first returns; and
    providing a second pulse before the sampling the second returns.

6. The method of Claim 1 further comprising:
    receiving third data associated with third returns associated with the first portion of the antenna;
    receiving fourth data associated with fourth returns associated with the second portion of an antenna; and determining the angle using the first data, the second data, the third data and the fourth data.

7. The method of claim 6, further comprising;
providing a first pulse before sampling the first return;
providing a second pulse before sampling the second returns;
providing a third pulse before sampling the third returns; and
providing a fourth pulse before sampling the fourth returns.

8. The method of claim 7, wherein the first and third pulses are full aperture pulses.

9. The method of claim 8, wherein V1 represents a vector associated with the first data, V2 represents a vector associated with the second data, and the angle is an angle within a beam to the terrain is represented by: arctan(VC)/2, where VC=V1 times the conjugate of V2.

10. The method of claim 9 wherein VC is in a rectangular form to allow coherent integration with other vectors.

11. The method of claim 1 wherein the first data and the second data are received for different azimuth angles.

12. An apparatus, comprising:
a radar antenna for receiving radar returns from a target;
means for receiving first data associated with first returns associated with a first portion of an antenna;
means for receiving second data associated with second returns associated with a second portion of an antenna, wherein the first portion includes the second portion, intersects the second portion, or is exclusive of the second portion; and
means for determining an angle within a beam to the terrain using the first and second data and using the angle to adjust or compensate antenna position to reduce radar antenna position errors.

* * * * *